June 12, 1956  W. F. SCHEEL  2,750,200
TANDEM AXLE SUSPENSION
Filed Feb. 4, 1952  5 Sheets-Sheet 1

INVENTOR
WALTHER F. SCHEEL
BY Strauch, Nolan & Diggins
ATTORNEYS

United States Patent Office 2,750,200
Patented June 12, 1956

2,750,200

TANDEM AXLE SUSPENSION

Walther F. Scheel, Detroit, Mich., assignor, by mesne assignments, to Rockwell Spring and Axle Company, Coraopolis, Pa., a corporation of Pennsylvania Application February 4, 1952, Serial No. 269,734

12 Claims. (Cl. 280—104.5)

The present invention relates to improvements in tandem axle assemblies for vehicles and more particularly to improvements in the axle stabilization mechanisms and frame suspensions of such assemblies.

In certain forms of tandem axle assemblies, a transverse member, which is pivoted upon the spring suspension intermediate to the axles, is provided to support the vehicle frame. Such a member is generally cylindrical in form and is variously known in the art as an intermediate or cross tube or as a trunnion shaft. In the past, as is illustrated by the disclosures of Patents No. 2,078,521 to Alden and No. 2,351,001 to Buckendale, it has been customary to rigidly and semi-permanently secure such members to the vehicle frame by fixing such members between spaced brackets which are secured to the frame as by riveting. In such constructions, when servicing of some part of the assembly which requires decoupling of the assembly from the vehicle frame is necessary, disassembly of the tandem axle assembly has heretofore been necessary. For example, removal of the intermediate tube for repair or replacement necessitates tearing down of the bogie assembly and chipping of the rivets by which the brackets are fixed to the frame. This has been an expensive and time consuming operation resulting in the loss of use of the vehicle for several days.

A primary object of my invention is to provide a tandem axle assembly for multi-wheel vehicles which is of such improved construction that such assembly can be easily and rapidly decoupled from the associated vehicle frame as a unit so that the various parts of the assembly are accessible for servicing.

A further major object of this invention is to provide, in a tandem axle assembly, an improved mounting for such transverse members by which such members can be readily removed from the assemblies for repair or replacement so that the time of servicing and repair is reduced to a matter of but several hours.

More specifically, it is an object of this invention to provide, in a tandem axle assembly, an improved mounting for such transverse members comprising support brackets each formed of separable components, one of which is permanently secured to the vehicle frame and which, in assembly, are secured together around the transverse member to form a unitary bracket rigid therewith so that, by separation of such components, the transverse member can be readily removed.

As has been previously indicated, in tandem axle assemblies of this type, the transverse member is pivotally mounted upon the spring suspension extending between the axles. One of the great difficulties of the prior art assemblies has resulted from the failure to provide for the proper lubrication of the bearings forming these pivots and for the effective eyclusion of dirt and moisture therefrom. These failures have resulted in relatively short life of these bearings and, as a consequence, have increased the maintenance cost unnecessarily. The effective exclusion of dirt and moisture from these bearings becomes of extreme importance when such tandem axle assemblies are used in vehicles which, in operation, may be subjected to submersion, as in fording operations. In the past, simple felt seals have been used around these bearings. Such seals have been found totally unsuitable for the extreme operating conditions to which vehicles of this type may be subjected.

It is, therefore, a further important object of my invention to provide, in a tandem axle assembly, an improved yet inexpensive lubricating structure for such bearings by which lubricant is properly retained in the bearings and by which dirt or moisture is excluded therefrom.

More specifically, it is an object of my invention to provide, in a tandem axle assembly, a sealed lubricant retaining chamber enveloping such bearings and including an annular, resiliently biased, flexible lubricant seal interposed between the transverse member and the associated part of the spring suspension forming the bearing housing so that all dirt and moisture is excluded from the bearing and the lubricant is retained therein.

In prior art vehicles of this type, the guide linkage rods, which form the lateral stabilization mechanism for locating the axles in transverse relation to the frame regardless of the unit articulation, have been mounted ahead of the forward axle and behind the rearward axle, or on top of each axle. Individual brackets are required in such mechanisms for coupling the guide rods to the frame structure. Such manner of positioning the guide rods has made difficult the removal of the bogie unit because of the interference from the guide rods and the latter top mounted guide linkage rods also interfered with floor clearance. In certain forms, linkage rods were also mounted oblique to the axle centerline so that an equalizing arm with three different centers was required. This, of course, made the machining cost high. Examples of such prior art structure are disclosed in Patent No. 1,825,194 to Marcum and General Engineering Bulletin, SD-472-P, entitled Double-Reduction Tandem Drive Unit, copyright 1948, by the Timken-Detroit Axle Company.

In order to overcome these disadvantages of the prior art, it is a primary object of my invention to provide an improved tandem axle assembly having an improved lateral axle stabilizing mechanism of the equalizer arm and guide rod type in which such mechanism is disposed entirely between the adjacent axles and so anchored to the frame that the mechanism can be readily decoupled to remove the entire tandem axle assembly from the frame as a unit.

Another major object of my invention is to provide, in a tandem drive axle assembly, an improved lateral stabilization mechanism in which the guide linkage rods are detachably anchored and in which a unique axle attachment bracket is detachably secured to the back of the forward axle housing and another like bracket detachably secured to the front of the rearward axle housing to support the equalizer arms.

More specifically it is an object of my invention to provide, in a tandem axle assembly an improved lateral stabilization mechanism, of the type having an equalizer arm intermediately pivoted upon the associated axle of such assembly and universally connected to the vehicle frame by rigid guide rods, in which the equalizer arm is so mounted upon the axle and the guide rods are so coupled to the frame structure that the lateral stabilizing mechanism for each axle can be readily and independently detached from the frame structure and/or from the axles to facilitate servicing of the assembly.

It has been past practice in longitudinal stabilizing mechanisms for tandem axle assemblies to provide universal connections of the ball and socket type at the torque rod ends which are formed of a resilient rubber socket forming bushing fixed on the rod ends and a ball received within each such socket and in which each ball is provided with a tapered shank for clamping them to the bogie assembly. In the assembly of these tandem axle assemblies, the springs are at substantially free or unloaded position while the torque rods are being secured. When rubber bushings are used, the coefficient of frictional engagement between the contacting surfaces of the ball and bushing is high so that relative movement between the ball and the torque rod induces a shear stress in the bushing rather than slippage between the ball and bushing. In the prior art mounting of these torque rods, the balls are so anchored relative to the frame and axles that no stress is induced in the associated bushings. Thus, when the vehicle is loaded and the springs are deflected, the torque rods rotate about their anchor points on the frame and axle brackets, twisting the rubber bushings and imparting a high shear stress to the rubber. Quite often the bushings are stressed to their elastic limit, under normal static rated load of the vehicle so that, when the vehicle hits a bump in the road and the wheels go into a jounce, the rubber bushings are twisted still more, stressing them beyond their elastic limit. Failure of the bushings often results from overstressing. In addition, this prior art manner of mounting requires expensive machining to prepare the tapered shank and receiving apertures and makes removal of the torque rods difficult.

In order to overcome these disadvantages of the prior art structure, it is another major object of this invention to provide an improved mounting for the balls of such rubber bushed torque rod universal connections that is relatively inexpensive and which positively prevents the installation of the torque rods in a manner such that the application of rated load to the vehicle can twist the torque rod bushings to their elastic limit.

More specifically, it is an object of my invention to eliminate the overstressing of the resilient torque rod universal connection bushings by providing the torque rod balls with two flat oppositely projecting mounting lugs of such construction and arrangement that the torque rod universal connection balls may be so secured to the assembly that the associated bushings will be substantially unstressed under normal static vehicle loads.

These and other objects of this invention will become apparent as the following detailed description thereof proceeds in reference to the accompanying drawings wherein:

Figure 6 is a fragmentary sectional view taken along the line 6—6 of Figure 1 and showing the left side frame support brackets transverse intermediate member pivotal mount in cross-section;

Figure 7 is a sectional view of the end assembly of a torque rod taken along the line 7—7 of Figure 1;

Figure 8 is a sectional view of that assembly taken along the line 8—8 of Figure 7;

Figure 9 is a vertical sectional view of the pivotal mount of the equalizer arm of the axle lateral stabilizing mechanism upon the axle housing taken along the line 9—9 of Figure 2; and Figure 10 is a partially sectional detail view of one of the guide rods of the transverse axle stabilizing mechanism.

*General*

Figure 1:
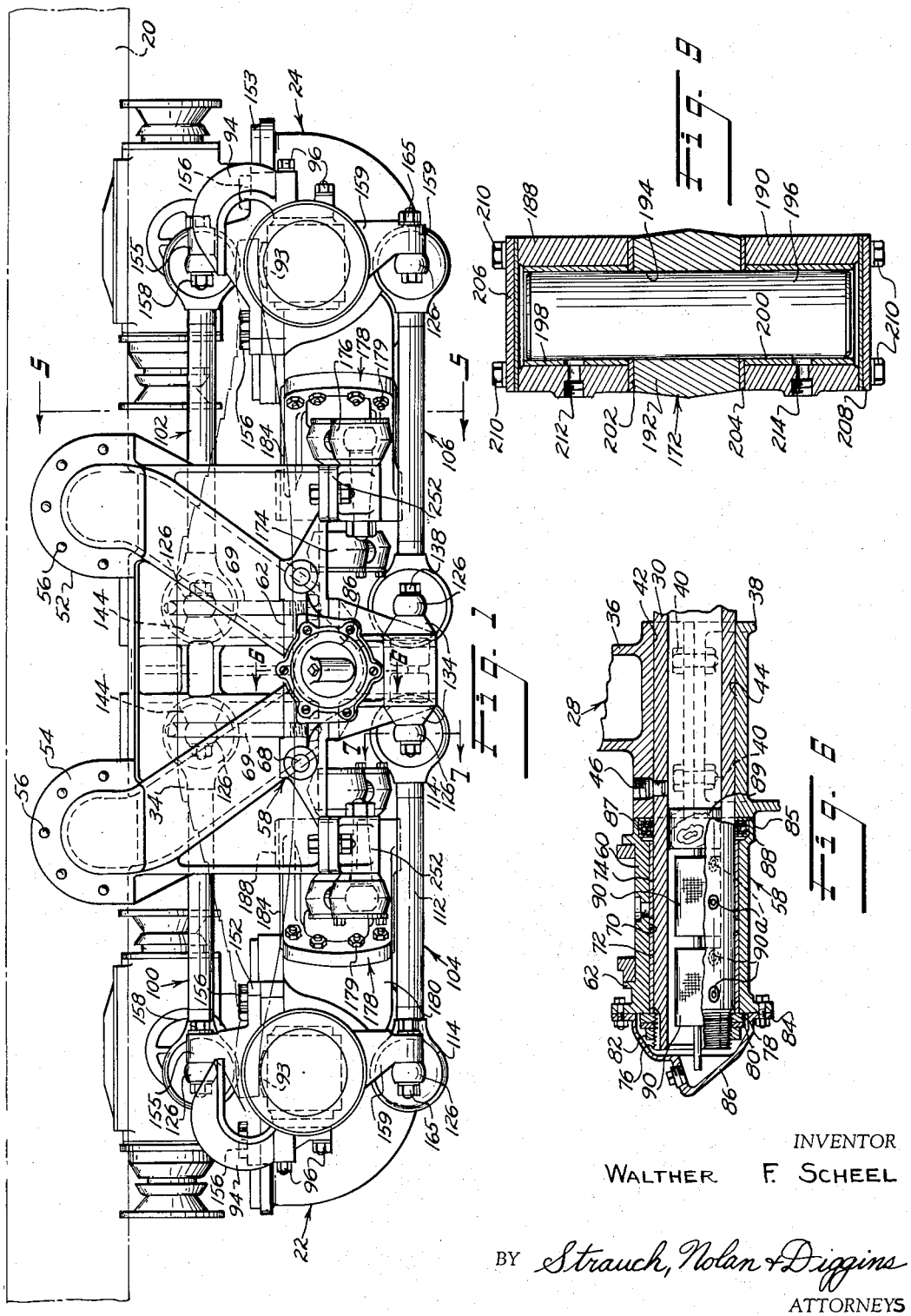
Figure 1 is a left side view of the tandem axle assembly of my present invention.
Figure 2:
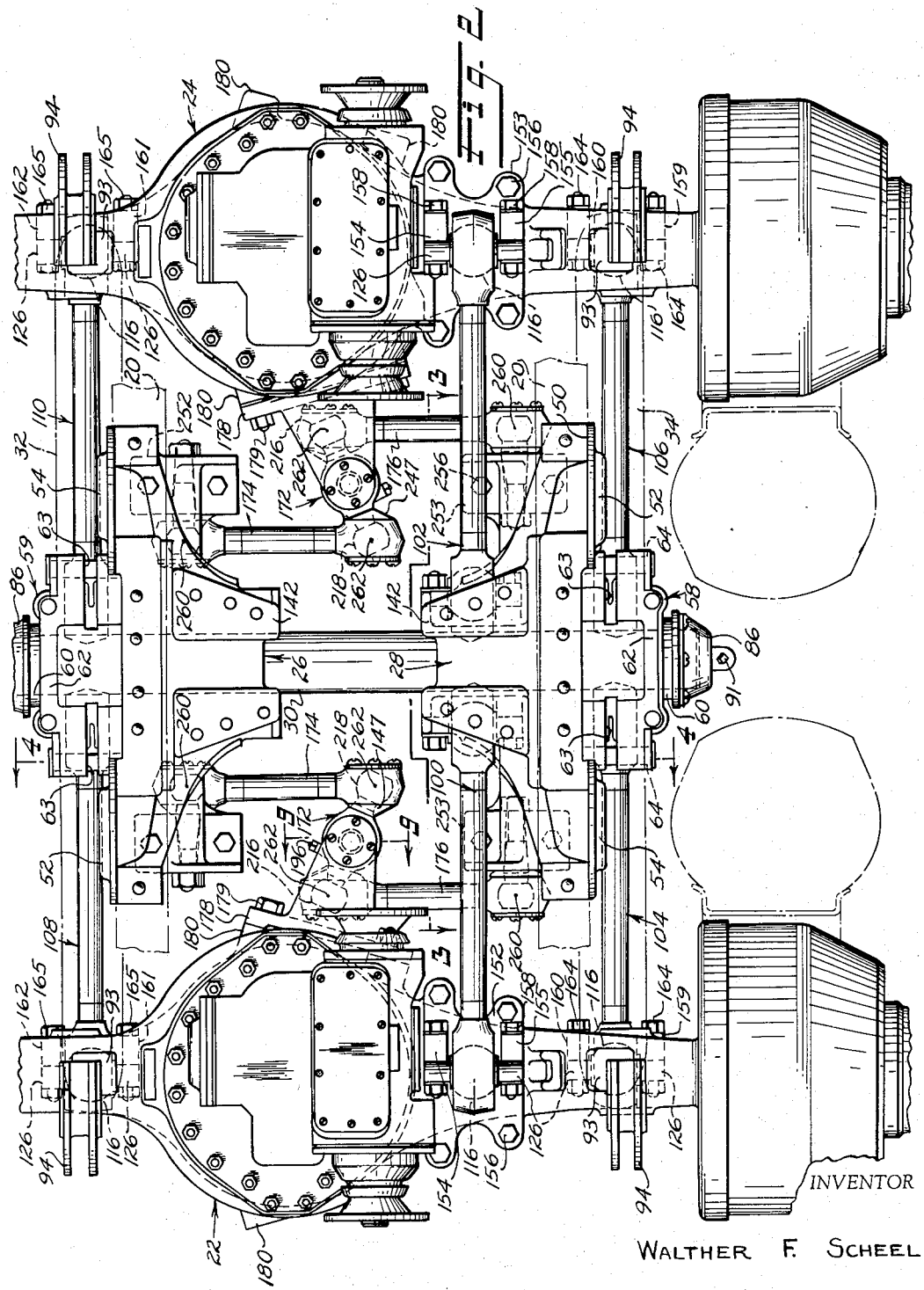
Figure 2 is a plan view of that assembly.

Referring now to the drawings in detail and particularly to Figures 1 and 2, it is seen that the improved tandem axle assembly of my invention includes an improved mechanism formed of a plurality of structurally independent, coacting components operable respectively to resiliently suspend a portion of a vehicle frame 20 between a pair of closely adjacent non-dirigible axles 22 and 24 which extend transversely of and are longitudinally spaced therebeneath, to longitudinally stabilize such axles relative to the frame 20, and to stabilize such axles laterally relative to the frame 20.

In the illustrated embodiment of my invention both axles are drive axles. While the most usual embodiments of my improved tandem axle assembly will include spaced drive axles, it will be recognized by those skilled in the art that the particular form of axle, per se, forms no part of my present invention. That is, either or both of the axles may be drive axles or dead axles. Drive axles 22 and 24 are drivingly interconnected to any suitable prime mover in any of the conventional manners well known in the prior art, which, since they form no part of the present invention and since their illustration would only tend to render the drawings confusing, have not been shown in the drawings.

As is shown in Figure 2, the vehicle frame 20 is supported at its opposite sides by support brackets 26 and 28 respectively. Brackets 26 and 28 are in turn supported by a transversely extending intermediate member 30 which is preferably of tubular form and which is variously known in the art as an intermediate tube, an intermediate shaft, and as a trunnion shaft. This intermediate member 30 extends transversely of the vehicle frame with its axis generally parallel to the axle axes, between the central portion of a pair of leaf springs 32 and 34, which extend longitudinally of the vehicle frame between the axles 22 and 24 at the right and left sides of the vehicle respectively. By this structure, the vehicle frame 20 is resiliently supported between the axles 22 and 24.

*Vehicle frame suspension*

Figure 3:
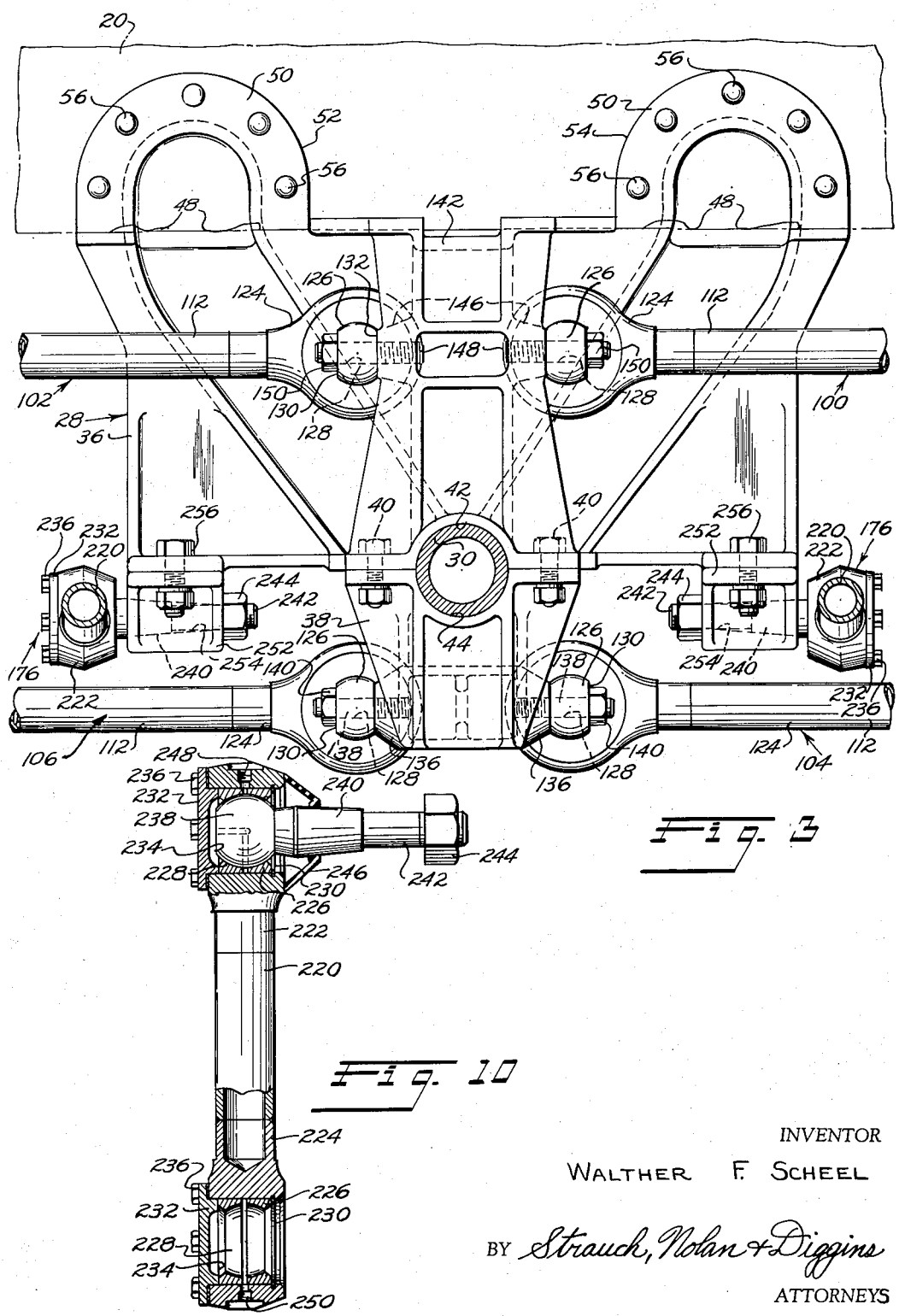
Figure 3 is an enlarged fragmentary sectional view of that assembly taken along the line 3—3 of Figure 2 and showing the structural relation of the left side frame support bracket to the associated parts of the longitudinal and lateral stabilization mechanisms.

The support of the frame 20 upon the transversely extending intermediate member 30 by brackets 26 and 28 is best illustrated in Figures 3–5 and 6. The structure of and manner of frame support by brackets 26 and 28 are identical so that the following description in reference to bracket 28 will suffice for both. As is shown in Figure 3, support bracket 28 is formed of separable upper and lower bracket members 36 and 38, which are detachably secured together as by bolts 40. Member 36 is the main bracket member and member 38 is a clamping member by which member 36 is firmly secured to intermediate member 30. The abutting faces of members 36 and 38 are formed with mating semi-cylindrical recesses 42 and 44 which coact to form a cylindrical through opening in which the end region of the tubular intermediate member 30 is received. When these two bracket members 36 and 38 are clamped together by bolts 40, the tube 30 is firmly clamped between them so that relative rotational or axial movement of the intermediate member 30 relative to the brackets 28 and 26 is prevented. As is shown in Figure 6, a pilot screw 46, which is threaded through bracket member 36 and the end of which is received in an aligned aperture through the wall of tube 30, assures accurate alignment of bracket 28 relative to tube 30. Screw 46, in addition, aids the clamping action of member 38 against member 36 and tube 30 in preventing movement of the tube 30 relative thereto.

Figure 4:
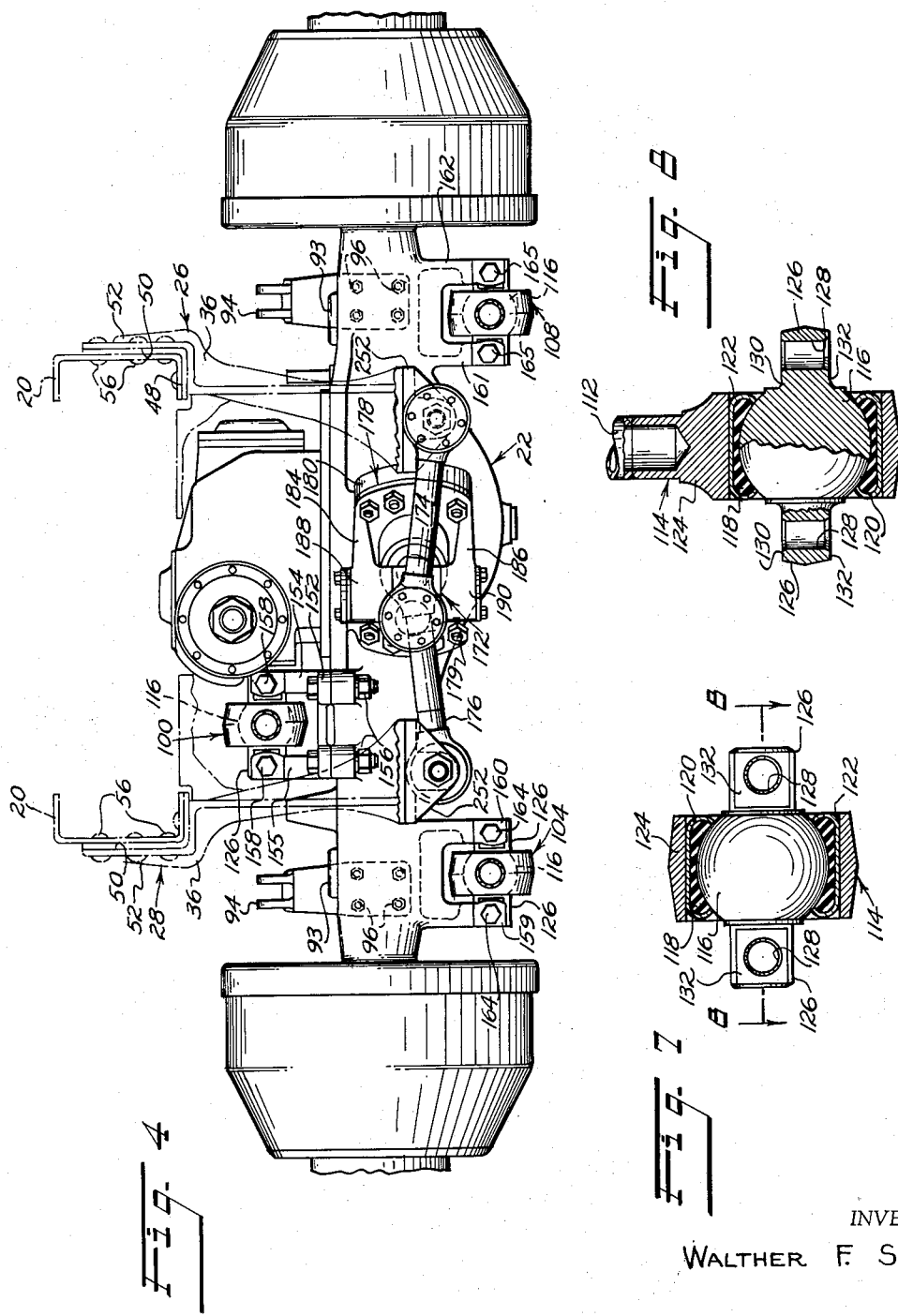
Figure 4 is a transverse sectional view taken substantially along the line 4—4 of Figure 2 and showing the structural relation of the front axle lateral stabilization mechanism to the frame support brackets.

As is shown in Figures 3 and 4, the upper bracket members 36 of brackets 28 and 26 are each formed with a discontinuous planar surface 48, and a discontinuous planar surface 50 normal thereto, the surface 50 being formed on the longitudinally spaced upwardly projecting portions 52 and 54 (see Figure 3) of the bracket members 36. The surfaces 50 of brackets 26 and 28 are parallel, extend longitudinally of the vehicle, and are symmetrically spaced transversely thereof relative to the vehicle longitudinal center line, while the surfaces 48 of members 36 lie in a common plane. These surfaces thus form an open top channel in which the vehicle frame 20, the side runners of which are preferably of channel cross section as shown, is received. The upper bracket members 36 of the brackets 26 and 28 are semi-permanently and rigidly secured to the frame side runners, as by rivets 56.

As a result of this improved construction of the vehicle frame support, when it becomes necessary for repair or replacement to disconnect the intermediate member 30 from the vehicle frame 20, it is merely necessary to remove the bolts 40 to release the clamping engagement on intermediate member 30 of the bracket members 36 and 38, of the two brackets 26 and 28. By my provision of two-piece or split brackets, such as these, which when separated release the intermediate tubular member 30, that portion of the bracket which is semi-permanently secured to the frame need no longer be disconnected from the frame. The difficult and time-consuming jobs of chipping the connecting rivets for removal and re-riveting upon reassembly have thus been eliminated.

As previously pointed out with reference to Figure 2, the intermediate tube extends transversely of the vehicle frame and is pivotally connected at its ends about an axis parallel to the axle axes with the central portion of the leaf springs 32 and 34 which form the spring suspension.

Figure 5:
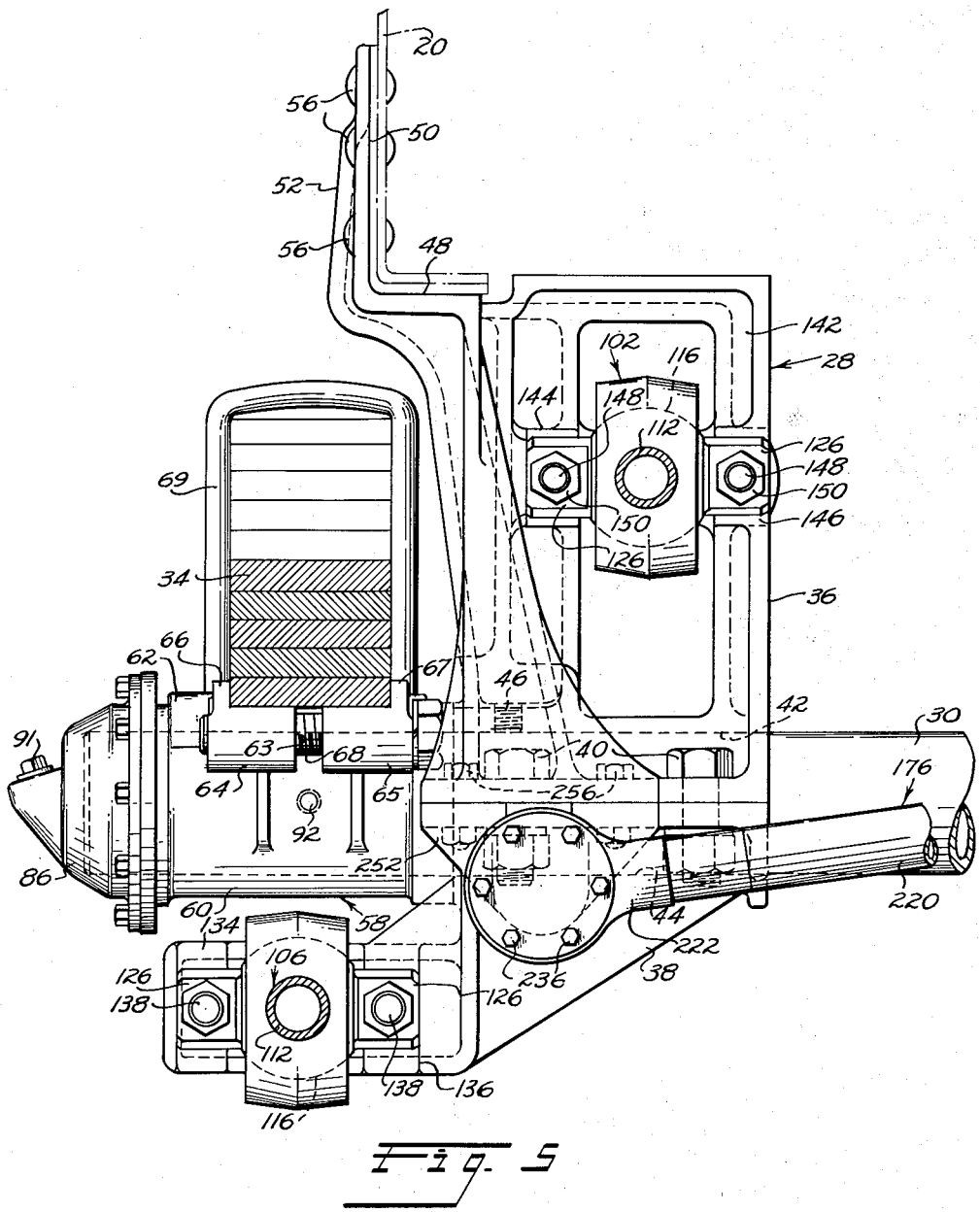
Figure 5 is an enlarged fragmentary sectional view of the assembly taken along the line 5—5 of Figure 1 and showing the left side frame support bracket and transverse intermediate member pivotal mount in elevation.

This pivotal mounting of intermediate tube 30 is shown best in Figures 2, 5 and 6. Spring saddles 58 and 59, each of which is formed with a lower body portion 60 through which the end of the intermediate tube 30 is rotatably received and each of which is formed with an upper spring clamping table 62 upon which the lowest leaf of each of the suspension springs 32 and 34 is clamped are provided at each end of intermediate member 30. Each of the ends of the tables 62 is bifurcated as at 63 and formed with aligned apertured bosses 64 and 65. Upwardly projecting clamping lugs 66 and 67 between which the lowest leaf of the suspension spring is received are provided at each end of each spring clamping table 62. Lugs 66 and 67 are clamped against such lowest leaf by a screw 68 which is rotatably received through the aperture in boss 65 and threadedly engaged with the aperture of boss 64. Thus, by rotative manipulation of the screws 68, the two halves of the bifurcated end regions of the table 62 can be drawn together to clamp the lugs 66 and 67 firmly against the lowest leaf of the spring. The leaves of the suspension springs 32 and 34 are clamped together and to the spring saddle 58 by U bolts 69 in the conventional manner as shown.

The pivotal mounting of spring saddles 58 and 59 relative to the intermediate tube 30 are identical and will be explained in reference to spring saddle 58, best shown in Figure 6. As is therein shown, the body portion 60 of spring saddle 58 is formed with a through bore 70 into the opposite ends of which are received bushings 72 and 74. The end of tubular member 30 extends through and is rotatably received by bushings 72 and 74. The extreme end portion of tubular member 30, which projects from the bore 70, is externally threaded at 76 to receive an adjusting nut 78, a lock washer 80 and a lock nut 82. The spring saddle 58 is fixed axially relative to the tubular member 30 between adjusting nut 78 which abuts against the outer face 84 of the body portion 60 surrounding the bore 70 and the adjacent face 85 of bracket 28 which abuts the inner face of body portion 60. The adjusting nuts 78 at each end of the tubular member 30 are so adjusted that axial movement of the tubular member 30 relative to the spring saddles 58 and 59 is inhibited while free relative rotational movement therebetween is permitted.

Improved means have been provided for more effectively lubricating these bearings and for more effectively excluding dirt and moisture therefrom. For this purpose I have provided bearing caps 86, which are secured in sealed relationship to the outboard end of the spring saddles 58 and 59 in surrounding relation to the projecting ends of intermediate tube 30 and resiliently biased annular lubricant seals 87 which are mounted within recesses 88 formed at the inboard ends of the saddles 58 and 59 and interposed between the tubular member 30 and the surrounding portion of the spring saddles 58 and 59. Wooden blocks 89 are suitably fixed in each end of the tubular member 30 to retain the lubricant in the end portions of the tubular member 30. A pair of screen cartridges 90, which are loosely received within such end portions of tubular member 30 retain and distribute oil to the bearing surfaces between tubular member 30 and bushings 72 and 74 through holes 90a formed through the wall of tubular member 30 as they bounce around within the tube end. This construction provides a closed lubricant chamber surrounding the bearings for the tubular member 30 upon the spring saddles 58 and 59. The open ends of such chambers are effectively sealed by the annular seals 87. Cartridges 90 are provided primarily to assure adequate oil distribution when the level of the oil within this chamber is low.

This novel and greatly improved bearing sealing structure effectively prevents the entrance of dirt and moisture into the bearing even when this bearing is submerged and effectively prevents the egress of lubricant from the bearing which may be introduced either through oil filler opening 91 or through grease fitting 92 (Figure 5). This arrangement provides a long wearing comparatively trouble free, easily disassembled trunnion for attachment of the bogie assembly to the vehicle.

As is best shown in Figure 1 in reference to spring 34, the springs 32 and 34 rest freely at their ends upon spring pads 93 fixed upon the tops of the axle housings. Spring rebound pads 94, which are secured to the axial housings 22 and 24 as by bolts 96, project over the ends of the springs 32 and 34 to prevent excessive rebound of the springs from the spring pads 93 as a safety measure.

*Axle longitudinal stabilizing mechanism*

The mechanism for longitudinally stabilizing the axles 22 and 24 relative to the vehicle frame 20 is of the parallelogram type consisting of transversely spaced pairs of longitudinally aligned torque rods, the adjacent ends of the torque rods of each pair being anchored relative to the vehicle frame and the opposite ends of the torque rods of each pair being anchored upon the front and rear axle housings respectively.

In the present embodiment of my invention, I have provided three of such pairs of longitudinally aligned torque rod assemblies, two lying below the pivot axis of the intermediate transverse member 30 and one above. As shown in Figures 1 and 2, the upper pair is formed by torque rod assemblies 100 and 102, the lower pair at the left side of the tandem axle assembly by torque rod assemblies 104 and 106, and the lower pair at the right side of the vehicle by torque rod assemblies 108 and 110. These six torque rod assemblies are identical in structure and symmetrical about their mid-points so they are interchangeable one with another and reversible end for end.

Each of these torque rod assemblies is formed of a tubular center section 112 and an end assembly 114 fixed on each end thereof as by butt welding. The structural details of these end assemblies are shown in Figures 7 and 8. These end assemblies 114 provide a ball and socket type universal joint adapted to form a universal connection between the torque rods and the associated part of the tandem axle assembly. This universal joint is formed by a ball 116, a surrounding annular resilient bushing 118, and an annular retainer 120 holding the bushing 118 in firm frictional engagement with the surface of the ball 116. Retainer 120, bushing 118, and ball 116 are assembled as a subassembly, and the subassembly is pressed into an aperture 122 through the end piece 124 which is butt welded to the central tubular section 112. The axes of the apertures 122 at each end of the torque rod assembly are parallel to each other and intersect and are normal to the axis of the torque rod.

The bushings 118 are preferably formed of a resilient rubber-like compound which will have a high coefficient frictional engagement with the surface of the ball 116 so that twisting of the ball 116 will impart a shearing force to the body of the bushing 118. These bushings may also be formed, if necessary due to the inavailability of rubber, of impregnated cotton, felt, or like friction bushing material of the type known in the trade as O & S bushings. When such bushings are used in lieu of rubber bushings, twisting of the ball 116 will cause relative sliding between the engaged surfaces of the ball 116 and the surrounding bushing 118 although the ball 116 and bushing 118 are in tight frictional surface contact.

The balls 116 are substantially spherical in form and are provided on each side with flat faced mounting lugs 126 formed integral therewith and projecting beyond the ends of the aperture 122. Lugs 126 are formed with fastener receiving apertures 128. These lugs 126 and their fastener receiving apertures 128 are of such form and of such location relative to the axis of the torque rod assembly that, when the torque rod assembly is mounted in position in the tandem axle assembly with substantially no load upon the spring suspension thereof, as is customary in the manufacture of these assemblies, a stress will be induced in the bushings 118 which will be relieved when the spring suspension is deflected under the normal static load of the vehicle. The critical feature of this portion of my invention is, therefore, that the ball mounting be so located and of such structural arrangement relative to the torque rod longitudinal axis that the bushing 118 be substantially unstressed when the vehicle is subjected to its normal static load. In the present form of my invention I have accomplished this result by providing the mounting lugs 126 with flat surfaces 130 and 132.

The anchoring of the torque rods at their adjacent ends relative to the vehicle frame is best illustrated in Figures 3 and 5. The lower torque rod assemblies 104 and 106 are secured at their adjacent ends to a portion of the lower bracket member 38 of the bracket 28 which projects transversely outwardly from the center of the tandem axle assembly beneath the spring saddle 58. This portion beneath the spring saddle 58 is formed on its opposite sides with spaced mounting lugs 134 and 136 between which is received the end portion of the end piece 124 of the associated torque rod assembly and to the end of which is secured the ball 116 of the associated torque rod assembly by the mounting lugs 126. The mounting lugs 126 of the ball 116 abut against the outer ends of the mounting lugs 134 and 136 of the bracket member 38 and are detachably secured thereto as by bolts 138 projecting through the apertures 128 thereof and threadedly engaged with aligned tapped holes in the mounting lugs 134 and 136 and by nuts 140 threadedly received on the exterior end of such bolts 138.

The adjacent ends of the upper torque rods 100 and 102 are similarly secured to the upper bracket member 36, which is formed with a central inwardly projecting portion 142 upon each side of which is formed a pair of spaced mounting lugs 144 and 146. The end regions of the end pieces 124 of these torque rod assemblies 100 and 102 are received between the mounting lugs 144 and 146 of these pairs and the balls 116 thereof are secured to these mounting lugs by bolts 148 and nuts 150 in the same manner as was described in reference to torque rods 104 and 106. The right side torque rod assemblies 108 and 110 are secured to the lower bracket member 38 of the bracket 26 in the same manner as has been shown and described in detail in reference to torque rods 104 and 106.

The manner in which the opposite ends of these torque rods are secured to the housings of axles 22 and 24 is illustrated in Figures 1 and 2, and in Figure 4 in reference to axle 22. For anchoring the outer ends of the upper pair of torque rods 100 and 102 to the axles 22 and 24 respectively, a pair of identical mounting blocks 152 and 153 are secured in transverse alignment upon the tops of the housings of axles 22 and 24 respectively by bolts 156. Mounting blocks 152 and 153 each have formed integral therewith a pair of spaced upwardly projecting arms 154 and 155 between which the end portions of the respective torque rods extend and to which the associated ball 116 of the universal connection of such torque rod end is detachably secured by bolts 158 which fix the ball mounting lugs 126 to the upwardly projecting arms 154 and 155 as shown.

The outer ends of the lower torque rods 104 and 108 are similarly secured to the housing of the front axle 22 as is shown in Figure 4. For anchoring torque rod 104, a pair of closely spaced downwardly projecting arms 159 and 160 are formed integral with the underside of the housing of axle 22 near the left end thereof and, for anchoring torque rod 108, a like pair of closely spaced downwardly extending arms 161 and 162 is similarly integrally formed near the right end of the housing of axle 22. The end of torque rod 104 is received between the arms 159 and 160, the associated ball 116 being fixed to such arms 159 and 160 by bolts 164. Torque rod 108 is similarly received between arms 161 and 162 and its ball 116 similarly detachably anchored to the arms 161 and 162 by bolts 165.

The lower torque rods 106 and 110 which extend rearwardly from brackets 28 and 26 respectively are similarly fixed to pairs of arms formed integral with the underside of the housing of axle 24 by bolts as shown in Figure 2, the parts on the rear axle 24 having been assigned the same reference numerals as the corresponding parts on the front axle 22.

One difference between the anchoring of the forward ends of torque rods 100, 104 and 108 upon axle 22 and the anchoring of the rearward ends of torque rods 102, 106 and 110 upon axle 24 will be noted by reference to Figures 1 and 2. The mounting lugs 126 of all six torque rods are mounted in abutment with the forward face of the associated anchoring arms on the front and rear axles. Therefore, since the structures of both of the axles are identical, the pivot axes of the latter three torque rods relative to axle 24 lie between the intermediate tube 30 and the associated anchor arms on axle 24, while the torque rod anchor arms on the forward axle 22 lie between the intermediate tube 30 and the pivot axes of the former three torque rods relative thereto. This, as will appear more clearly presently, permits use of corresponding parts throughout the assembly which are identical in form and does not modify the action of the axle longitudinal stabilizing mechanism in any material respect.

As is apparent by reference to Figure 1, the distance between the transverse pivot axis of torque rod 100 relative to axle 22 and the coaxially aligned transverse pivot axes of torque rods 104 and 108 relative to axle 22 is equal to the distance between the respective pivot axes of these torque rods upon the brackets 26 and 28. The torque rods 100, 104 and 108 thus form a parallelogram linkage for transmitting brake and drive torques between the axle 22 and the frame 20 to prevent rotational movement of the front axle relative to the vehicle frame 20. The transverse pivot axes of the torque rods 102, 106 and 110 longitudinally stabilizing the rear axle relative to the frame are similarly related to form a parallelogram linkage for preventing rotational movement of rear axle 24 relative to the frame 20.

Transverse axle stabilizing mechanism

The transverse axle stabilizing mechanism shown in Figure 2 is of the general type disclosed in the aforesaid Marcum patent which consists of an equalizer arm or lever 172 pivoted intermediate its ends centrally of the associated axle about an axis normal to the axle axis and rigid rods 174 and 176 universally interconnected to the equalizer arms and to the opposite sides of the vehicle frame. As is well known, mechanisms of this type prevent movement of the axles laterally of the frame while permitting free tipping movement of the axles relative to the frame or movement thereof in a path normal to the frame.

Since the function and structure of the components of the stabilizing mechanisms for the forward and rear axes are identical, corresponding parts will be assigned the same reference numeral and the following detailed description of the stabilizing mechanism of the forward axle will suffice for both.

The equalizer arm 172 is pivoted upon a yoke-like bracket 178, which is rigidly and detachably secured by bolts 179 upon the one of the angularly disposed mounting bosses 180 which is formed on the face of the axle housing adjacent intermediate tube 30. The outer end of the arms 184 and 186 of this yoke-like bracket 178 are formed with coaxially apertured opposed bosses 188 and 190 (shown best in Figure 4) between which the central hub 192 of the equalizer arm 172 is received. As is shown in Figure 9, the central hub 192 of equalizer arm 172 is formed with an aperture 194 through which a pivot pin 196 is non-rotatably received as by a force fit. Bushings 198 and 200 are provided within the apertures of bosses 188 and 190 respectively and thrust washers 202 and 204 are interposed between the hub 192 and the adjacent faces of bosses 188 and 190 to provide the pivotal mounting of the equalizer arm 172 upon the bracket 178. The yoke-like bracket 178 is so mounted upon the axle housing that the pivot axis of equalizer arm 172 relative thereto is normal to the axle axis.

Caps 206 and 208 are secured over the outer ends of bosses 188 and 190 respectively by screws 210 to enclose the bearing structure for pivot pin 196 to form a chamber into which lubricant can be introduced through suitable grease fittings threadedly engaged in tapped holes 212 and 214 formed radially through the bosses 188 and 190 respectively.

As is best shown in Figure 2, the opposite ends of equalizer arms 172 have formed integrally thereon spheroidal balls 216 and 218 which are received within suitable socket forming bushings fixed upon the ends of guide rods 176 and 174 respectively. These balls 216 and 218 together with their coacting bushings upon the guide rods provide a universal connection between the equalizer arm 172 and the guide rods 176 and 174.

The structure of each of the guide rods of the transverse axle stabilizing mechanism is identical, that structure being shown in detail in Figure 10. As is shown in that figure, the guide rods are formed of a central tubular section 220 to the ends of which are suitably secured transversely apertured end pieces 222 and 224 as by butt welding. The apertures through the end pieces 222 and 224 are cylindrical in form, their axes being mutually parallel, and normal to and intersecting the longitudinal axis of the guide rods. Within the aperture of each of the end pieces 222 and 224 are disposed a pair of opposed similar annular bushing members 226 and 228 which coact to form a generally spherical socket. Bushing members 226 and 228 are preferably formed of steel as illustrated. A resilient retainer ring 230 which engages an annular groove in the aperture wall is provided to prevent axial outward movement of the bushing 226 from the aperture and a cap 232, piloted within the aperture by a boss 234 and secured to the end pieces by screws 236, is provided to close one end of the aperture, to prevent axial movement of bushing 228 outwardly of the aperture, and to hold the bushing members 226 and 228 in firm surface contact with the ball received therebetween. If desired, rubber or O & S bushings similar to those of the torque rod assemblies may be used in lieu of the steel bushings shown but would, of course, have to be much larger than the steel bushings to withstand the high stress caused by the great annular movement. When steel bushings are used, relative movement between the guide rod and the associated balls produces sliding movement between the contacting surfaces of the balls and bushings rather than inducing a shear stress in the bushings as when rubber bushings are used.

The socket formed in the aperture of the end piece 224 is that in which the associated spheroidal ball at the end of the equalizer arm 172 is universally received. The socket formed by the bushings in the aperture of the end piece 222 universally receives a spheroidal ball 238 from a side of which projects a tapered shank 240 which terminates in a generally cylindrical and threaded extension 242 upon which is threadedly received a nut 244. It is this ball 238 which, in the final tandem axle assembly, is firmly anchored relative to the vehicle frame 20 as will appear presently.

A resilient flexible member 246, which is of truncated conical form, which is fixed around its larger end to end piece 222, and which at its smaller end resiliently engages the surface of the tapered shank 240, forms a flexible seal for excluding dirt and moisture from and retaining lubricant within the universal joint. Due to the resiliency and flexibility of the member 246, this seal is effective throughout the positions which the shank 240 can assume relative to the end piece 222. Similar flexible universal joint sealing members 247 (Figure 2), which are secured to the end pieces 224 of each guide rod, perform a like function for the universal joints between the equalizer arms 172 and the associated guide rods 174. These members 247, it will be noted, differ in shape from members 246, having the shape illustrated when unflexed.

Threaded apertures 248 and 250 are formed through the ends of the end pieces 222 and 224 respectively to permit introduction of lubricant into the socket between the bushing 226 and 228 through the use of a suitable grease fitting. Apertures 248 and 250 are aligned with the annular groove defined between bushings 226 and 228 so that lubricant distribution is uniform around the balls.

As is shown in Figures 2 and 3, the balls 238 of the outer ends of the guide rods are anchored at the opposite ends of the lower extremities of the upper frame support bracket members 36. For this purpose, suitable mounting blocks 252 formed with tapered bores 254 are secured to the underside of the outer ends of the bracket members 36 by bolts 256 as shown. The balls 238 of the outer end of the guide rods are fixed to these members 252 by the reception of the tapered shanks 240 within the tapered bores 254 and by the wedging action therebetween induced by the tightening of the nuts 244 upon the threaded extremities of the shank. The mounting blocks 252 are symmetrical in form so that, merely by reversal of the block when necessary, identical blocks may be utilized at any of the four positions upon the brackets 26 and 28.

The assembly just described is in substantially the position shown in the drawings when the vehicle is under full static load. Under this condition, the axes of the guide or stabilizer rods 174 and 176 lie in spaced parallel planes normal to the plane of the frame as viewed in plan as in Figure 2. Movement of the axles toward or away from the vehicle frame causes the rods 174 and 176 to pivot about points 260 and 262, the variation in the distance longitudinally of the frame between the pivot points 262 at the ends of the equalizer arms 172 is compensated for by the articulation of equalizer arms 172 about the pivot axes of pins 196. The distances between the pivot axis of pin 196 and the two pivot points 262 for the associated equalizer arms 172 always remain equal so that lateral movement of the axle is prevented and its proper relationship to the vehicle frame is maintained.

Summary

It can now be readily seen that the improvements and novel features of this invention have provided a tandem axle bogie assembly for heavy duty vehicles that utilizes to the utmost the interchangeability of like parts and provides for extremely simple assembly and disassembly of the several component parts to greatly facilitate the removal for service and replacement of components without disturbing adjacent parts, or for the quick and easy removal from the vehicle of the entire bogie assembly, including the intermediate tube. This last feature has never before been possible with conventional production vehicles.

The preferred manner of decoupling the tandem axle assembly from the frame is to disassemble bolts 40 which clamp the bracket members 36 and 38 around the intermediate tube 30, to remove the bolts 256 which secure the lateral axle stabilizer guide rod anchoring blocks 252 to the upper bracket members 36, and to disconnect the upper torque rods 100 and 102 from the bracket member 36 of bracket 28. The frame 20 and upper bracket members 36 can then be lifted and the entire bogie unit rolled out from under the chassis.

The incorporation of the novel features of this invention, therefore provides a tandem axle vehicle that is quickly and easily serviced, including even major parts replacement or overhaul, and that requires a minimum variety of spare stockroom parts for service replacement due to wear or damage.

As previously disclosed, intermediate tube 30 is removably supported by clamp-like brackets 26 and 28, permitting the tube 30 to be removed from the vehicle frame with the bogie assembly.

Frame brackets 26 and 28 are interchangeable right and left and removably anchor the inner ends of lower and upper torque rods 100 to 110 inclusive to the frame 20. Brackets 26 and 28 also cooperate with mounting blocks 252 to removably secure the outer ends of guide or stabilizer rods 174 and 176 to the frame 20.

The novel universal joint ball and bushing assembly of the torque rods requires but one flat machined surface on each of the associated mounting arms or lugs at each of its ends for mounting, and the torque rods are interchangeable upper and lower as well as end for end. The mounting structure of the balls of these universal joints is such that, when used with a rubber bushing, it can be installed only in a manner that assures no shearing forces to be present when the vehicle is at full or rated static load. This eliminates the possibility heretofore present that the rubber bushing will be loaded to its elastic limit at rated vehicle load and subsequently overstressed in service with failure resulting.

The novel design and manner of mounting the axle lateral stabilizing mechanisms provides a compact easily serviced arrangement. Interchangeability of component parts is maximum. The novel brackets are inexpensive, easily machined and serviced and readily accessible.

It will be noted that only one equalizer arm anchor bracket is needed on each axle housing and both the forward and rearward guide rod outer ends are secured to the same central frame brackets 26 and 28.

Lubrication of the spring saddle pivot bearings is simplified and made positive by the provision of a lubricant retaining and dirt excluding chamber.

It can therefore be understood that a new and useful contribution to the art has hereby been disclosed in a novel, compact bogie assembly.

This invention may be embodied in specific forms other than the one described in detail without departing from the spirit or essential characteristics thereof. The disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a frame, a tandem axle assembly comprising a pair of closely spaced axles supported at their ends by ground engaging wheels, a spring suspension extending between said axles, a transverse member pivotally connected to said suspension intermediate said axles, a two-piece support bracket rigidly connected to the frame of the vehicle at each side, means for rigidly securing each of said two-piece brackets to said transverse member, means structurally independent of said suspension and coupled between said two-piece support brackets and each of said axles for transmitting brake and drive torque reactions to the frame and stabilizing said tandem axle assembly longitudinally of the vehicle frame, and lateral stabilizing means for each of said axles structurally independent of said suspension and said longitudinal stabilizing means and comprising an equalizing lever pivoted intermediately upon the side of the associated axle adjacent the other of said axles about an axis normal to the axis thereof and transversely extending rods universally connected at their inner ends to opposite ends of said equalizing lever and universally connected at their outer ends to the respective support brackets.

2. In a vehicle, a frame, a tandem axle assembly comprising a pair of closely spaced axles supported at their ends by ground-engaging wheels, a spring suspension extending between said axles, a transverse member pivoted on said suspension intermediate said axles about an axis generally parallel to the axle axes, a two-piece support bracket rigidly connected to the frame of the vehicle at each side, means for rigidly clamping each of said two-piece brackets to said transverse member, means structurally independent of said suspension and coupled between said two-piece support brackets and each of said axles for transmitting brake and drive torque reactions to the frame and stabilizing said tandem axle assembly longitudinally of the vehicle, and means structurally independent of said longtiudinal stabilizing means and of said suspension for laterally stabilizing each of said axles, said lateral stabilizing means comprising an equalizing lever pivoted intermediately upon the side of the associated axle adjacent the other of said axles about an axis normal to the axis thereof and transversely extending rods universally connected at their inner ends to opposite ends of said equalizing lever and universally connected at their outer ends to the respective two-piece support brackets, each of the universal connections being of the ball and socket type formed by a socket forming bushing fixed to said rods and a ball-like member received within the socket formed by said bushing and rigidly connected to the associated part of said assembly to form such universal connection.

3. In a vehicle having a frame, a tandem axle assembly comprising a pair of closely spaced axles supported at their ends by ground-engaging wheels, a spring suspension extending between said axles, a transverse member pivoted on said suspension intermediate said axles about an axis generally parallel to the axes thereof, a two-piece support bracket having an upper portion rigidly connected to the frame of the vehicle at each side and a lower portion removably attached to the upper portion, means for rigidly clamping each of said portions to said transverse member, mounting blocks detachably secured on each of said upper support brackets, means structurally independent of said suspensions and coupled between said two-piece support brackets and each of said axles for transmitting brake and drive torque reactions to the frame and stabilizing said tandem axle assembly laterally of the vehicle, means structurally independent of said suspension and of said lateral stabilizing means for stabilizing said axles longitudinally of said frame comprising a plurality of transversely spaced pairs of generally longitudinally aligned torque rods, an upper rod of each pair being spaced above the axles and a lower rod of each pair being spaced below the axles, the upper torque rods of each of said pairs being universally connected to said mounting blocks on said upper portion of the two-piece support bracket at their adjacent ends and universally connected to opposite ones of said axles at their opposite ends, and the lower torque rods of each of said pairs being universally connected to said lower portion of the two-piece support bracket at their adjacent ends and connected to opposite ones of said axles at their opposite ends.

4. In the vehicle having a frame, a tandem axle assembly comprising a pair of closely spaced axles supported at their ends by ground-engaging wheels, a spring suspension extending between said axles, a transverse member pivotally connected to said suspension intermediate said axles, a two-piece support bracket rigidly connected to the frame of the vehicle at each side, means for rigidly clamping each of said two-piece brackets to said transverse member, means structurally independent of said suspension and coupled between said two-piece support brackets and each of said axles for transmitting brake and drive torque reactions to the frame and stabilizing said tandem axle assembly laterally of the vehicle, means, structurally independent of said suspension and of said means for stabilizing said axles laterally of said frame, comprising a plurality of transversely spaced pairs of generally longitudinally aligned torque rods, the torque rods at each of said pairs being universally connected to said two-piece support brackets at their adjacent ends and universally connected to one of said axles at their opposite ends, the universal connection of said torque rods being of the ball and socket type formed by a resilient socket forming bushing fixed to the ends of the associated torque rod and a ball-like member received within said bushing and rigidly fixed to the associated part of said assembly to form such universal connections.

5. In a vehicle having a frame, a pair of axles extending transversely of and longitudinally spaced beneath the frame, a spring suspension extending between said axles longitudinally of the frame, a transversely extending member pivoted on said suspension between said axles about an axis generally parallel to the axes of said axles, a two-piece frame support bracket rigidly secured to said frame and supported by said member, means stabilizing said axles longitudinally of said frame, and a mechanism for stabilizing each of said axles transversely of said vehicle, each of said stabilizing mechanisms comprising a yoke detachably secured centrally of the associated axle upon its face adjacent the other of said axles, an equalizer arm intermediately pivoted upon said yoke upon an axis normal to the axle axis, a transversely extending rod universally connected to each end of said equalizer arm, a mounting block detachably secured to each of said two-piece frame support brackets, and a universal coupling connecting the other end of said transversely extending rods to one of said mounting blocks whereby the lateral stabilizing mechanism at each axle can be detached independently for servicing without disassembly of the universal connections thereof.

6. In a vehicle having a frame, a tandem axle assembly comprising a pair of axles extending transversely of and longitudinally spaced beneath the frame, a spring suspension extending between said axles longitudinally of the frame, a transversely extending member pivoted on said suspension between said axles about an axis generally parallel to the axes of said axles, a two-piece frame support bracket rigidly secured to said frame and supported by said member, means stabilizing said axles longitudinally of said frame, and a mechanism for stabilizing each of said axles transversely of said vehicle frame, each of said transverse stabilizing mechanisms comprising a yoke detachably secured centrally of the associated axle upon its face adjacent the other of said axles, an equalizer arm intermediately pivoted upon said yoke about an axis, normal to the associated axle axis, a transversely extending rod universally connected to each end of each of said equalizer arms, a mounting block detachably secured to each of said two-piece frame support brackets, and a universal coupling connecting the other end of each of said transversely extending rods to one of said mounting blocks, the universal connections of said mechanism being formed by a socket-forming bushing fixed on the end of the rods, and a ball received within the socket of each bushing and rigidly fixed to the associated equalizer arm or mounting blocks to form such connections.

7. In a vehicle having a frame, a tandem axle assembly comprising a pair of axles extending transversely of and longitudinally spaced beneath said frame, a spring suspension extending between said axles, means pivotally supporting said frame on said suspension intermediate said axles, and means for stabilizing said axles relative to said frame longitudinally and transversely of the vehicle, said longitudinal stabilizing means comprising a plurality of transversely spaced pairs of generally longitudinally aligned torque rods, one of each of said pairs being universally connected between said frame supporting means and the forward one of said axles and the other of each of said pairs being universally connected between said frame supporting means and the rearward one of said axles, and a universal joint forming each of said universal connections and comprising a resilient socket forming bushing fixed on the end of said torque rods and a ball so firmly received within the socket of said bushing that relative pivotal movement between said ball and the associated torque rod can only be produced by inducing a reacting stress in the associated resilient bushing, and means so attaching said ball in a fixed position on the axle assembly that the associated bushing is not stressed when said suspension is subjected to the normal static load of said vehicle.

8. In a vehicle having a frame, a tandem axle assembly comprising two transversely extending closely longitudinally spaced drive axles beneath a rearwardly spaced portion of the frame, a spring suspension extending between said axles and so pivotally supporting the frame intermediate said axles that said assembly may have pivotal movement relative to said frame about a lateral axis substantially parallel to said axles, means independent of said spring suspension for interconnecting said axles and said frame for stabilizing said tandem axle assembly longitudinally of the vehicle, and means structurally distinct from said suspension and said longitudinal stabilizing means connected between said tandem axle assembly and said frame for laterally stabilizing said tandem axle assembly during its relative movement with respect to said frame, said lateral stabilizing means comprising an equalizer lever intermediately pivoted about an axis normal to the axle axis on each drive axle, structurally identical rods lying in a plane normal to the axis of the vehicle and located below the axis of the axles connecting the opposite ends of said lever to opposite sides of the frame, structurally identical universal connections between the adjacent rod ends and the lever, and structurally identical universal connections between the outer rod ends and the frame so that each of said rods is interchangeable with each of the other of said rods.

9. In a vehicle having a tandem axle assembly as set forth in claim 8 wherein mounting blocks are detachably secured to opposite sides of the frame and said structurally identical rods connect opposite ends of said equalizer lever to said mounting blocks.

10. In a vehicle having a frame, a pair of axles extending transversely of and longitudinally spaced beneath the frame, a spring suspension extending between said axles longitudinally of the frame, a trunnion member pivoted on said suspension between said axles about an axis generally parallel to the axes of said axles, means stabilizing said axles longitudinally of said frame, and a mechanism for stabilizing each of said axles transversely of said vehicle, each of said transverse stabilizing mechanisms comprising a yoke detachably secured centrally of the associated axle upon its face adjacent the other of said axles, an equalizer arm intermediately pivoted upon said yoke upon an axis normal to the axle axis, a transversely extending rod universally connected to each end of said equalizer arm, a mounting block detachably secured to each side of the frame, and a universal coupling connecting the other end of said transversely extending rods to one of said mounting blocks whereby the transverse stabilizing mechanism at each axle can be detached independently for servicing without disassembly of the universal connection thereof.

11. In combination with a vehicle frame and two longitudinally spaced transversely extending axles, a tandem axle suspension comprising a trunnion extending transversely of the frame between said axles, springs pivoted on the trunnion ends and having their opposite ends operatively associated with the respective axles, trunnion mounting brackets at each side of the frame, each said bracket comprising an upper part rigidly secured to said frame and a lower part removably secured to said upper part and non-rotatably clamping the trunnion between said parts, a pair of upper longitudinal torque rods universally connected at adjacent ends to the upper part of the bracket at one side of the frame and at their other ends to the respective axles, a pair of lower longitudinal torque rods universally connected at adjacent ends to the lower part of said one bracket and at their opposite ends to the respective axles, and a second pair of lower longitudinal torque rods universally connected at adjacent ends to the lower part of the other of said brackets and at their other ends to the respective axles.

12. In the combination defined in claim 11, means for laterally stabilizing said suspension comprising an equalizer arm intermediately pivoted on each axle upon an axis substantially perpendicular to the axle axis, and a rigid transverse rod universally connected to each end of each of said equalizer arms, the two rods connected to each equalizer arm extending laterally oppositely, and the two rods at each side of the vehicle being universally connected at their outer ends to the upper part of the bracket at that side.

References Cited in the file of this patent

UNITED STATES PATENTS

| | | |
|---|---|---|
| 341,009 | Howe | May 4, 1886 |
| 1,602,466 | Swett | Oct. 12, 1926 |
| 1,761,135 | Le Moon | June 3, 1930 |
| 1,764,237 | Applebaker | June 17, 1930 |
| 2,098,522 | Simning | Nov. 9, 1937 |
| 2,346,164 | Holmstrom et al. | Apr. 11, 1944 |
| 2,389,017 | Bagnall | Nov. 13, 1945 |
| 2,481,891 | Van Raden | Sept. 13, 1949 |
| 2,488,002 | Carraher | Nov. 15, 1949 |
| 2,520,778 | Page | Aug. 29, 1950 |
| 2,600,768 | Heth | June 17, 1952 |
| 2,607,431 | Buckendale | Aug. 19, 1952 |
| 2,611,626 | Thomas | Sept. 23, 1952 |